US010969220B2

United States Patent
Brambilla et al.

(10) Patent No.: US 10,969,220 B2
(45) Date of Patent: Apr. 6, 2021

(54) CHARACTERIZING A SAMPLE BY MATERIAL BASIS DECOMPOSITION

(71) Applicant: Commissariat a L'Energie Atomique et aux Energies Alternatives, Paris (FR)

(72) Inventors: Andrea Brambilla, Veurey-Voroize (FR); Alexia Gorecki, Grenoble (FR); Alexandra Potop, Grenoble (FR)

(73) Assignee: Commissariat a L'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 15/181,882

(22) Filed: Jun. 14, 2016

(65) Prior Publication Data
US 2016/0363442 A1 Dec. 15, 2016

(30) Foreign Application Priority Data
Jun. 15, 2015 (FR) ..................... 15 55438

(51) Int. Cl.
*G01B 5/02* (2006.01)
*G01B 7/02* (2006.01)
(Continued)

(52) U.S. Cl.
CPC ............. *G01B 15/02* (2013.01); *G01N 23/02* (2013.01); *G01N 23/087* (2013.01);
(Continued)

(58) Field of Classification Search
CPC ...... G01B 15/02; G01N 23/02; G01N 23/087; G01N 2223/03; G01N 2223/302;
(Continued)

(56) References Cited

U.S. PATENT DOCUMENTS 6,124,141 A * 9/2000 Muller ............. H01L 29/66181
438/14
7,254,501 B1 * 8/2007 Brown .................. G01J 3/28
702/28
(Continued)

FOREIGN PATENT DOCUMENTS

WO WO2015/091083 * 6/2015

OTHER PUBLICATIONS

Berrut et al., "Barycentric Lagrange Interpolation", 2004, Siam Review, vol. 46, No. 3, pp. 501-517.*
(Continued)

*Primary Examiner* — Michael P Nghiem
(74) *Attorney, Agent, or Firm* — Oblon, McClelland, Maier & Neustadt, L.L.P.

(57) ABSTRACT

A method for characterizing a sample, by estimating a plurality of characteristic thicknesses, each being associated with a calibration material, including acquiring an energy spectrum ($S^{ech}$) transmitted through this sample, located in an X and/or gamma spectral band; for each spectrum of a plurality of calibration spectra ($s^{base}(L_k; L_t)$) calculating a likelihood from said calibration spectrum ($S^{base}(L_k; L_t)$), and from the spectrum transmitted through the sample ($S^{ech}$), each calibration spectrum ($S^{base}(L_k; L_t)$) corresponding to the energy spectrum transmitted through a stack of gauge blocks, each formed of a known thickness of a calibration material; estimating the characteristic thicknesses ($L_1, L_2$) associated with the sample according to the criterion of maximum likelihood.

24 Claims, 6 Drawing Sheets

(51) Int. Cl.
*G01B 11/02* (2006.01)
*G01B 13/02* (2006.01)
*G01B 15/02* (2006.01)
*G01N 23/02* (2006.01)
*G01N 23/087* (2018.01)

(52) U.S. Cl.
CPC ... *G01N 2223/03* (2013.01); *G01N 2223/302* (2013.01); *G01N 2223/304* (2013.01); *G01N 2223/401* (2013.01); *G01N 2223/423* (2013.01); *G01N 2223/50* (2013.01)

(58) Field of Classification Search
CPC ....... G01N 2223/304; G01N 2223/401; G01N 2223/423; G01N 2223/50
USPC .......................................................... 702/172
See application file for complete search history.

(56) References Cited

U.S. PATENT DOCUMENTS

| | | | |
|---|---|---|---|
| 8,929,508 B1 | 1/2015 | Alvarez | |
| 9,311,277 B2* | 4/2016 | Rinkel | G01N 23/087 |
| 9,603,249 B2* | 3/2017 | Rathburn | H01L 23/49822 |
| 9,689,994 B2* | 6/2017 | Rinkel | G01T 1/171 |
| 2006/0285114 A1* | 12/2006 | Cao | G01N 21/3504 |
| | | | 356/437 |
| 2010/0202584 A1* | 8/2010 | Wang | G01N 23/087 |
| | | | 378/53 |
| 2012/0239310 A1* | 9/2012 | Ouvrier-Buffet | G01T 1/171 |
| | | | 702/32 |
| 2013/0046500 A1* | 2/2013 | Rinkel | G01T 1/171 |
| | | | 702/104 |
| 2013/0110438 A1* | 5/2013 | Rinkel | G01T 7/005 |
| | | | 702/85 |
| 2013/0256534 A1* | 10/2013 | Micheels | G01N 21/255 |
| | | | 250/339.07 |
| 2014/0126693 A1* | 5/2014 | Beldjoudi | G01N 23/087 |
| | | | 378/54 |
| 2016/0363545 A1* | 12/2016 | Gorecki | G01N 23/087 |

OTHER PUBLICATIONS

U.S. Appl. No. 13/512,486, filed Aug. 6, 2012, Jean Rinkel et al.
French Preliminary Search Report dated Feb. 29, 2016 in French Application 15 55438, filed Jun. 15, 2015 (with English Translation of Category of Cited Documents).
Alexandra-Iulia POTOP "Imagerie Par Rayons X Resolue en Energie: Methodes de Decomposition en Base de Materiaux Adaptees a Des Detecteurs Spectrometriques", Imagerie Par Rayons X Resolue en Energie: Methodes de Decomposition en Base de Materiaux Adaptees a Des Detecteurs Spectrometriques, Oct. 2, 2014, 80 pages.
Ruoqiao Zhang et al. "Model-Based Iterative Reconstruction for Dual-Energy X-Ray CT Using a Joint Quadratic Likelihood Model", IEEE Transactions on Medical Imaging, vol. 33, No. 1, Jan. 2014, 18 pages.

\* cited by examiner

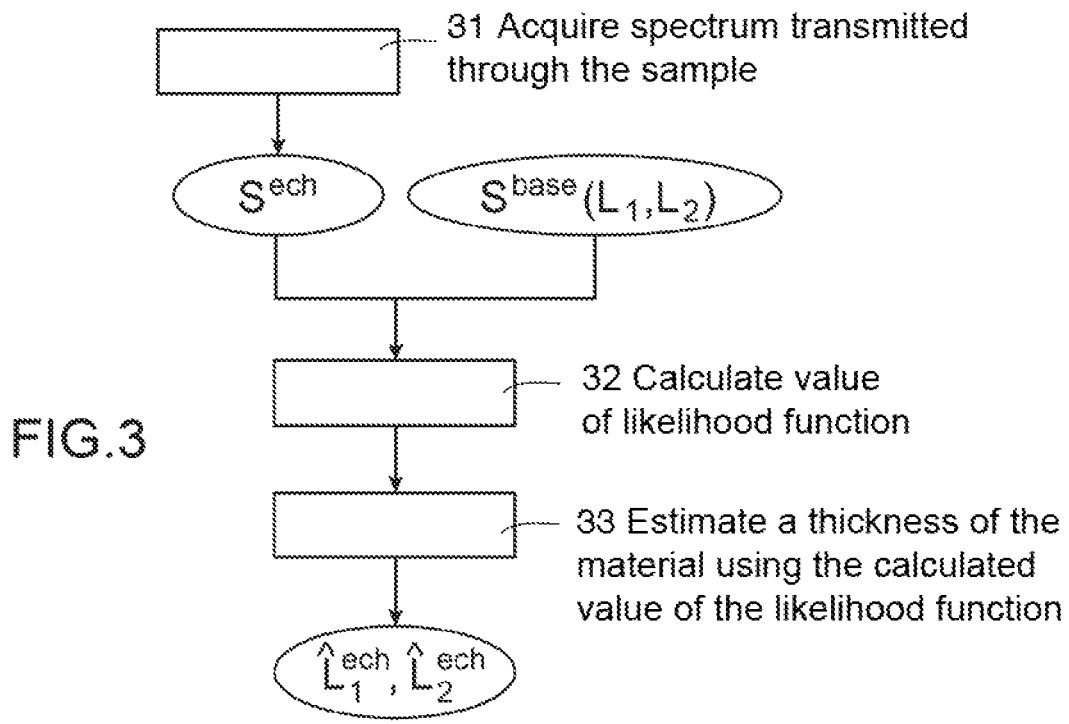
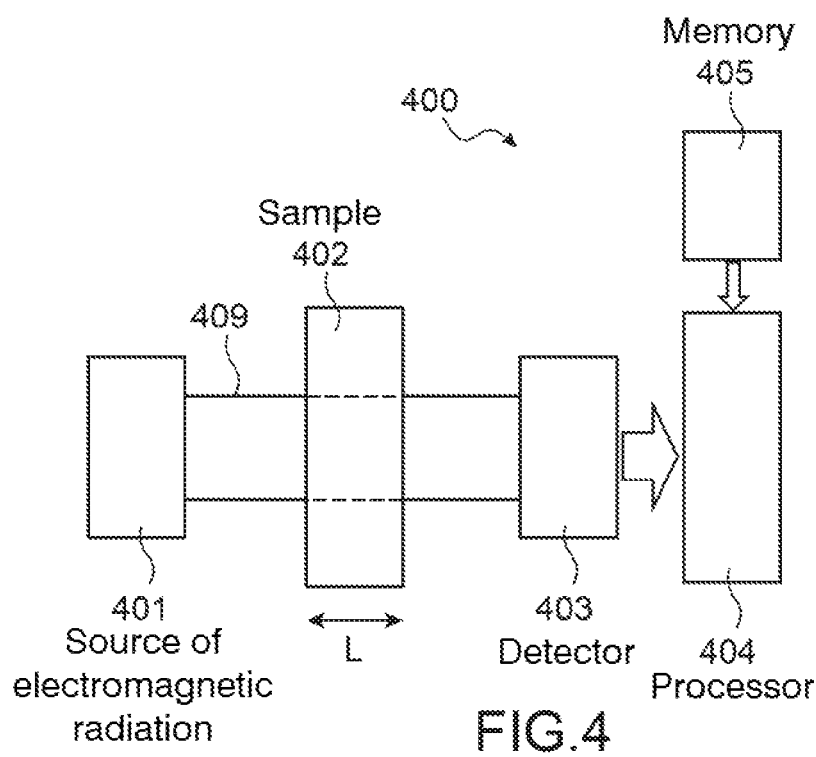

CHARACTERIZING A SAMPLE BY MATERIAL BASIS DECOMPOSITION

TECHNICAL FIELD

The present invention relates to the field of characterizing a sample by X spectrometry (wavelength lower than $10^{-8}$ m) and/or gamma spectrometry (wavelength lower than $10^{-11}$ m). The invention more particularly relates to determining a series of characteristic thicknesses, each being associated with a calibration material. A material basis decomposition is usually mentioned.

STATE OF PRIOR ART

In prior art, different solutions are known to characterize a sample, in particular by X and/or gamma spectrometry.

It could be shown in particular that for samples having a quite low mean effective atomic number, the attenuation function of the sample $L*\mu(E)$ can be theoretically described as a linear combination of the respective attenuation coefficients $\mu_{MAT1}$, $\mu_{MAT2}$ of two calibration materials MAT1 and MAT2. In other words, the sample of a thickness L generates the same attenuation as a thickness $L_1^{ech}$ of the material MAT1 plus a thickness $L_2^{ech}$ of the material MAT2:

$$\mu_{MAT1}(E)*L_1^{ech}+\mu_{MAT2}(E)*L_2^{ech}=L*\mu(E) \quad (1).$$

Materials MAT1 and MAT2 are named calibration materials, since their respective attenuation coefficients define a decomposition basis to characterize the sample. Thicknesses $L_1^{ech}$ and $L_2^{ech}$ are said to be characteristic, since they characterize the sample in the decomposition basis. The attenuation function is the product of a thickness of a material by its attenuation coefficient. Each attenuation coefficient is a function of the energy. The attenuation function is considered over a plurality of energy channels (also referred to as energy bands or energy gaps).

FIG. 1 illustrates this property. It is a graph depicting on the abscissa the energy in kilo-electron-volt (keV) according to a logarithmic scale, and on the ordinate the value of the attenuation function according to a logarithmic scale (without unit). Curve 101 depicts the attenuation function $\mu_{ECH}(E)*L$ of a 10 mm thick polytetrafluoroethylene sample. Curve 102 depicts the attenuation function $\mu_{MAT1}(E)*L_1^{ech}$ of a 1.49 mm thick graphite sample. Curve 103 depicts the attenuation function $\mu_{MAT2}(E)*L_2^{ech}$ of a 7.66 mm thick aluminium sample. The sum of curves 102 and 103 corresponds to curve 101, so that the sample can be defined by $L_1^{ech}=1.49$ mm and $L_2^{ech}=7.66$ mm, the calibration materials being graphite and aluminium. The different attenuation functions are referred to as linear, since they have no discontinuity (k-edge).

In practice, the attenuation function of the sample is measured by way of the device 200 such as depicted in FIG. 2. The device 200 comprises a source of electromagnetic radiation 201, emitting an analysis beam 209 in the X and/or gamma spectral band. The device 200 also comprises a detector 203 able to count a number of received photons, for each energy channel of a plurality. The source 201 and the detector 203 form together a spectrometer. The sample 202, of a thickness L, is provided between the source 201 and the detector 203, and is crossed by the analysis beam 209. The analysis beam 209 is attenuated by crossing the sample according to the Beer-Lambert law:

$$S_{ECH}(E)=S_0(E)\exp(-\mu_{ECH}*L) \quad (2)$$

$S_0(E)$ is the energy spectrum measured in the absence of the sample, and $S_{ECH}(E)$ is the energy spectrum measured in the presence of the sample, named spectrum transmitted through the sample.

The attenuation function of the sample is then defined by:

$$\mu_{ECH}*L = -\ln\left(\frac{S_{ECH}(E)}{S_0(E)}\right) \quad (3)$$

Theoretically, the attenuation function of the sample, then the attenuation function of a thickness $L_1$ of the calibration material MAT1 (named first attenuation function) and the attenuation function of a thickness $L_2$ of the calibration material MAT2 (named second attenuation function) are measured. Then, the coefficients a and b assigned to the first and second attenuation functions are searched for to define the attenuation function of the sample as a linear combination of the first and second attenuation functions. $L_1^{ech}$ and $L_2^{ech}$, or more precisely the estimations of these lengths, $\hat{L}_1^{ech}$ and $\hat{L}_2^{ech}$, are deduced therefrom.

In practice, the measurement of the energy spectra is prone to errors. These errors especially come from the photon noise (statistical fluctuation of the number of photons which interact in the spectrometer), from the width of the energy channels detected by the spectrometer, from the electronic noise and other imperfections of the spectrometer. These errors recur in the measured attenuation function of the sample, and in the first and second attenuation functions. These errors affect the linearity of the relationship expressed in the equation (1), and prevent the characteristic thicknesses $L_1^{ech}$ and $L_2^{ech}$ from being estimated as described above.

A known solution consists in modelling the detection chain by a response function of the system, to get rid of the errors brought by the former by inverting the function of the system. A drawback of this solution is that it is dependent on the quality of said modelling, a high quality modelling being difficult to achieve.

U.S. Pat. No. 8,929,508 provides an analytical formula directly supplying an estimation of the characteristic thicknesses $L_1^{ech}$ and $L_2^{ech}$, based on the hypothesis that the relationship (1) is linear on each of a plurality of small gaps of thicknesses and of transmitted spectra. Such a hypothesis however does not provide a sufficiently accurate estimation of the characteristic thicknesses, especially as it rests on the hypothesis according to which the attenuation by the sample in each energy channel follows a Gaussian distribution, whereas a Poisson distribution is the most realistic hypothesis.

An object of the present invention is to provide a method and a device allowing an accurate estimation of the characteristic thicknesses used to characterize a sample in a calibration material basis.

DISCLOSURE OF THE INVENTION

This object is achieved with a method for characterizing a sample, by estimating a plurality of thicknesses, named characteristic thicknesses, each being associated with a material, named calibration material. The method according to the invention comprises the following steps:

acquiring an energy spectrum, named spectrum transmitted through the sample, said spectrum being defined by a number of photons transmitted through the sample in each channel of a plurality of energy channels located in an X and/or gamma spectral band;

for each spectrum of a plurality of energy spectra, named calibration spectra, calculating the value of a likelihood function from said calibration spectrum and from the spectrum transmitted through the sample, each calibration spectrum corresponding to the spectrum transmitted through a stack of gauge blocks, each gauge block being formed of a known thickness of a calibration material;

determining the estimations of the characteristic thicknesses associated with the sample, from said values of a likelihood function and according to the criterion of maximum likelihood.

Thus, the limitations associated with the measurement errors existing in prior art described in the introduction are overcome.

The characteristic thicknesses of calibration materials, characterizing a sample in a calibration basis, can be estimated directly from measured spectra and without resorting to purely theoretical spectra obtained by modelling an acquisition chain. Thus, the inaccuracies related to the imperfections of such a modelling are overcome.

The estimation of the characteristic thicknesses is not based on any hypothesis which is particularly simplifying.

The measurement error is smaller, by way of using the series of calibration spectra forming a calibration material decomposition basis, named calibration basis.

Furthermore, as will be detailed later, such a method enables the right model of a behaviour of the attenuation in each energy channel to be used (behaviour which can be referred to as measurement noise, and modelled by a Poisson statistical distribution). The use of the rightest model provides an accurate estimation of the characteristic thicknesses.

The invention also relates to a computer program product arranged to implement a method according to the invention.

Finally, the invention relates to a device for characterizing a sample, comprising an electromagnetic source emitting into an X and/or gamma spectral band, and a detector for measuring a spectrum transmitted through the sample, said spectrum being defined by a number of photons transmitted through the sample in each channel of a plurality of energy channels. According to the invention the device comprises a processor, arranged to implement the method according to the invention, and a memory receiving the calibration spectra, the memory being connected to the processor.

BRIEF DESCRIPTION OF THE DRAWINGS

The invention will be better understood upon reading the description of exemplary embodiments given by way of purely indicating and in no way limiting examples, with reference to the accompanying drawings in which:

FIG. 3 schematically illustrates a first embodiment of the method according to the invention;

FIG. 4 schematically illustrates a device according to the invention;

DETAILED DISCLOSURE OF PARTICULAR EMBODIMENTS

The invention relates to a method for characterizing a sample. Characterizing here consists in defining a spectrum of the energy transmitted through the sample of a thickness L, as being the spectrum of the energy transmitted through a stack of two gauge blocks or more, each consisting of a different calibration material.

Each gauge block of a calibration material has a thickness, named characteristic thickness, or equivalent thickness, which is attempted to be estimated and which characterizes the sample.

The calibration materials are materials the respective attenuation coefficients of which define a decomposition basis to characterize any sample. Two calibration materials or even more are considered.

Thus, a linear combination of the spectra transmitted through a respective calibration material, each associated with a characteristic thickness, can be associated with the sample.

The aim is, in an equivalent way, to associate to the sample a linear combination of the attenuation coefficients of calibration materials, each associated with a characteristic thickness (the energy spectrum $S_0(E)$ in the absence of a sample and a gauge block being a constant).

Figure 1:
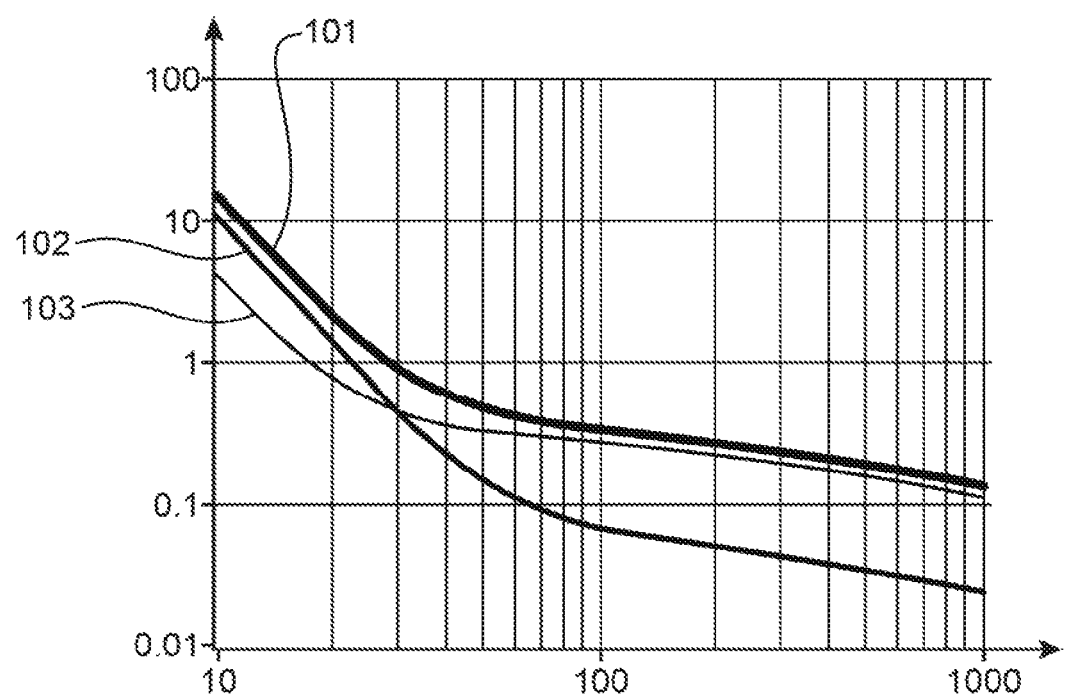
FIG. 1 illustrates the linear attenuation functions of a sample and of two calibration materials, used in the methods according to prior art.
Figure 2:
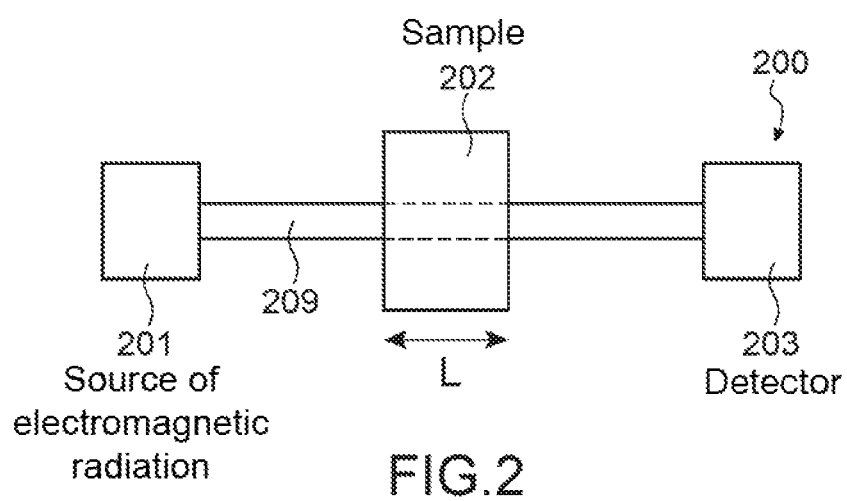
FIG. 2 schematically illustrates a device for measuring an energy spectrum according to the invention.

The method according to the invention is implemented in a device 400 such as depicted in FIG. 4. The source 401 and the detector 403 correspond to the source 201 and the detector 203 described with reference to FIG. 2.

The thickness corresponds to the distance travelled in the sample 402, respectively in a gauge block of a calibration material by an analysis beam 409 emitted by the electromagnetic radiation source 401 and received by the detector 403 after crossing the sample 402, respectively the gauge block (refer to FIG. 4).

The sample here refers to any object, in particular a biological sample, such as a biological tissue. The method according to the invention does not dictate any condition regarding its mean effective atomic number. Nevertheless, the latter is advantageously lower than 30.

During an initial calibration step, a series of spectra is acquired, each being a spectrum of the energy transmitted through a stack of gauge blocks. Each energy spectrum is defined by a number of photons transmitted through the stack, in each channel of a plurality of energy channels located within an X and/or gamma spectral band. Such an energy spectrum is referred to as a calibration spectrum.

Each gauge block, also referred to as a standard, or a calibration sample, consists in a calibration material, and has a known thickness. It is for example a lamella consisting of said material. The plural gauge blocks of the stack are formed of distinct calibration materials.

This step is preferably implemented only once, the same calibration spectra being used afterwards to characterize any sample.

This step is preferably implemented in the device of FIG. 4, in the same measurement conditions as the spectrum transmitted through the sample such as hereafter defined (same spectrometer, same emission power, same distance between the source and the detector, same irradiation duration). When necessary, several measurements on a same stack of gauge blocks are averaged in order to circumvent the photon noise. Alternatively, the calibration spectra are calculated from a numerical modelling of the device of FIG. 4, in particular a numerical modelling of the acquisition chain.

In a first step 31, the spectrum transmitted through the sample, $S^{ech}$, is acquired using the detector 403. The spectrum transmitted through the sample is the spectrum of the energy transmitted through said sample. It is defined by a number of photons per energy channel, for each channel of a plurality of energy channels. The spectrum transmitted through the sample comprises at least two energy channels, preferably several tens. For example, the energy channels cover together all the energy band ranging from 10 to 120 keV, and each have a width of 1 keV. The energy channels of the spectrum transmitted through the sample are preferably the same as those of the calibration spectra.

For each of the plurality of calibration spectra, in step 32, the value of a likelihood function is calculated, corresponding to the likelihood of the calibration spectrum taking into account the spectrum transmitted through the sample $S^{ech}$. The different energy channels of a same spectrum are processed together, and not independently from each other.

Each calibration spectrum being associated with a known thickness of a calibration material, the likelihood function according to the invention depends on the thicknesses of the calibration materials.

Two calibration materials MAT1 and MAT2 are for example considered. A calibration spectrum $S^{base}(L_1; L_2)$ is the energy spectrum transmitted through a gauge block of a thickness $L_1$ of a material MAT1 joined to a gauge block of a thickness $L_2$ of a material MAT2. The likelihood function calculated from the spectrum transmitted through the sample $S^{ech}$ and from the calibration spectrum $S^{base}(L_1; L_2)$ thus depends on $L_1$ and on $L_2$.

Figure 5:
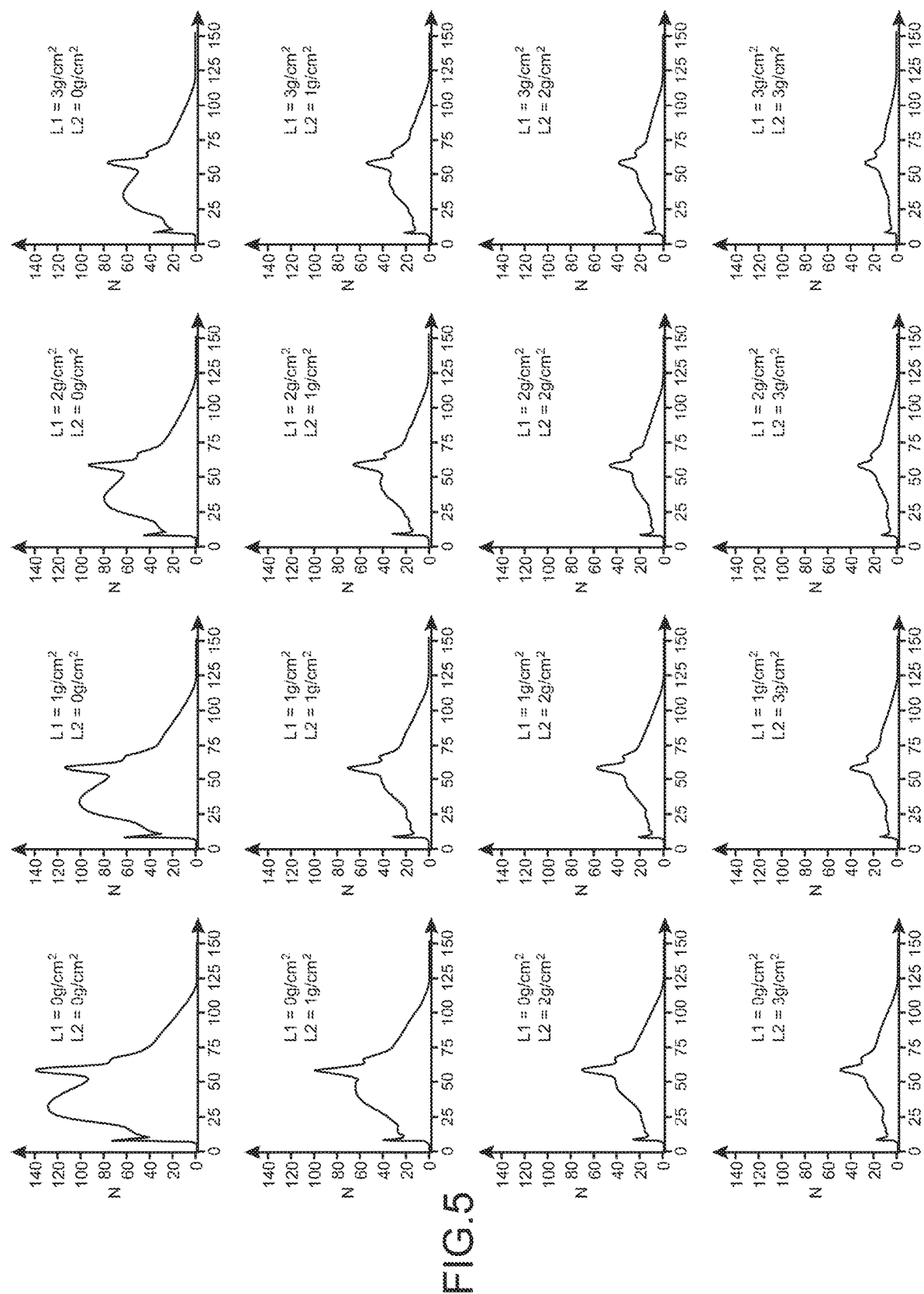
FIG. 5 illustrates calibration spectra according to the invention.

FIG. 5 illustrates a series of calibration spectra. $L_1$ can take 4 values 0, 1, 2 or 3 (length unit). $L_2$ can take 4 values 0, 1, 2 or 3 (length unit). 4×4=16 calibration spectra are thus obtained, corresponding to all the possible combinations of $L_1$ and $L_2$.

Let $L_1$ be able to take N1 values, and $L_2$ be able to take N2 values, at the end of step 32 N1×N2 values of the likelihood function are obtained.

In step 33, these values of the likelihood function are used to determine an estimation of a thickness $L_1^{ech}$ of the material MAT1 and of a thickness $L_2^{ech}$ of the material MAT2, such that the spectrum transmitted through the sample corresponds to the spectrum transmitted through the juxtaposition of a gauge block of a thickness $L_1^{ech}$ of a material MAT1 and of a gauge block of a thickness $L_2^{ech}$ of a material MAT2. The estimated values of $L_1^{ech}$ and $L_2^{ech}$ are noted $\hat{L}_1^{ech}$ and $\hat{L}_2^{ech}$.

The aim is to search for, by means of the calibration basis, the calibration spectrum consisting of a thickness $L_1$ of the material MAT1 and of a thickness $L_2$ of the material MAT2, which most resembles the spectrum transmitted through the sample.

The criterion used for the estimation is the maximum likelihood.

In the example illustrated in FIG. 3, it is searched the maximum value among the N1×N2 values of the previously calculated likelihood function. In other words, in the calibration basis, the calibration spectrum which most resembles the spectrum transmitted through the sample is searched for. The thicknesses $L_1$, $L_2$ associated with this maximum value of the likelihood function correspond to the estimations $\hat{L}_1^{ech}$ and $\hat{L}_2^{ech}$ of the characteristic thicknesses $L_1^{ech}$ and $L_2^{ech}$.

For example, let a thickness $L_1$ of polyethylene take the values 0, 1, 2 or 3 (length unit), and a thickness $L_2$ of PVC take the values 0, 1, 2 or 3 (length unit), for a given sample, the following values of the likelihood function are obtained:

| | $L_2$ | | | |
|---|---|---|---|---|
| $L_1$ | 0 | 1 | 2 | 3 |
| 0 | 4457 | 5173 | 5646 | 5925 |
| 1 | 5891 | 6068 | 6121 | 6075 |
| 2 | 6093 | 6044 | 5914 | 5721 |
| 3 | 5887 | 5705 | 5470 | 5192 |

We then have $\hat{L}_1^{ech}=2$ and $\hat{L}_2^{ech}=1$, the maximum value of the likelihood function being 6121.

Thus, according to the invention, to estimate the characteristic thicknesses, a plurality of energy spectra are used, associated with a plurality of combinations of known thicknesses of calibration materials. In the general case with M calibration materials, each calibration material y being able to take $U_y$ different thicknesses, we have a calibration basis available comprising $\Pi_{y=1}^{M} U_y$ calibration spectra. The number of possible thicknesses for each material can vary. Each calibration spectrum is noted $S^{base}(L_1, L_2, \ldots, L_M)$ with $L_1, L_2, \ldots, L_M$ the thicknesses of the materials MAT1, MAT2, ..., MATM.

The spectrum transmitted through the sample to be characterised is compared with those of the calibration basis by using the following likelihood function:

$$V(L_1, L_2, \ldots L_M) = \Pi_{j=1}^{R} P(S_j^{ech} | S_j^{base}(L_1, L_2, \ldots L_M)) \quad (4)$$

$V(L_1, L_2, \ldots L_M)$ describes the likelihood that the spectrum transmitted through the sample corresponds to the spectrum transmitted through a stack of thicknesses $L_1$, $L_2$, ... $L_M$ of the M materials of the calibration basis.

$S_j^{ech}$ is the number of photons (or counts) counted in the channel j, in the spectrum transmitted through the sample, $S^{ech}$ with R energy channels. The R components of the vector $S^{ech}$ are independent random variables.

$P(S_j^{ech} | S_j^{base}(L_1, L_2, \ldots L_M))$ is the probability that the channel j of the spectrum transmitted through the sample, corresponds to the channel j of the calibration spectrum associated with thicknesses $L_1, L_2, \ldots L_M$ of the materials 1 to M.

Thus, the likelihood function is equal to the product, for each of the channels j, of the probabilities that the channel j of the spectrum transmitted through the sample (measured spectrum) corresponds to the channel j of the calibration spectrum associated with thicknesses $L_1, L_2, \ldots L_M$.

The function P describes a statistical modelling of a transmission rate through the sample, in each energy channel.

According to a particularly advantageous embodiment, the arrival of photons in each energy channel is assumed to follow a statistical Poisson distribution. The choice of a Poisson distribution enables the best estimation to be provided, this distribution best modelling the physical reality in the spectrometer.

Thus, in each energy channel j, the probability to have $S_j^{ech}$ photons transmitted through the stack of the thicknesses $L_{ki}$ of the materials MATi, i=M, during a predetermined irradiation duration, is given by:

$$P(S_j^{ech} | v_j) = e^{-v_j} \frac{v_j^{S_j^{ech}}}{S_j^{ech}!} \quad (5)$$

with $v_j$ the number of photons transmitted through the sample in the channel j, during an irradiation time T (identical for the spectrum transmitted through the sample and for the calibration spectra).

$P(S_j^{ech}|v_j)$ is the probability of measuring $S_j^{ech}$ counts for an expected value $v_j$.

If it is assumed that the thicknesses of the materials 1 to M are the thicknesses $L_1, L_2, \ldots L_M$, there is:

$$v_j = \mu S_j^{base}(L_1, L_2, \ldots L_M,) \quad (6)$$

$\mu$ corresponds to the drift of the spectrometer between the measurement of the calibration spectra and the measurement of the spectrum transmitted through the sample. This drift is assumed to be zero, corresponding to $\mu=1$, which is a quite realistic hypothesis.

The likelihood function is then expressed:

$$V(L_1, L_2, \ldots L_M) = V(S^{ech}, S^{base}(L_1, L_2, \ldots L_M)) \quad (7)$$

$$= \prod_{j=1}^{R} \exp(-S_j^{base}(L_1, L_2, \ldots L_M)) \frac{S_j^{base}(L_1, L_2, \ldots L_M)^{S_j^{ech}}}{S_j^{ech}!}$$

The characteristic thicknesses of the sample are obtained by searching for the maximum of the likelihood function. For convenience, it is simpler to try to maximise the logarithm of the likelihood function, which is quicker to calculate. There is in particular:

$$\ln(V(L_1, L_2, \ldots L_M)) \propto \quad (8)$$

$$-\sum_{j=1}^{R} S_j^{base}(L_1, L_2, \ldots L_M) + \sum_{j=1}^{R} S_j^{ech} \ln(S_j^{base}(L_1, L_2, \ldots L_M))$$

Then, the characteristic thicknesses of the M basis materials are given by:

$$(\hat{L}_1^{ech}, \hat{L}_2^{ech}, \ldots, \hat{L}_M^{ech}) = \operatorname{argmax}(\ln(V(L_1, L_2, \ldots L_M))) \quad (9)$$

It can be seen that the invention implements a probabilistic approach, based on likelihood calculations and using as an estimation criterion, the maximum likelihood.

This approach is based on Bayes theorem, and on the hypothesis according to which all the combinations of thicknesses are equiprobable. This hypothesis enables to establish that:

$$\hat{\theta} = \operatorname{argmax}(P(S^{ech}|\theta)) \quad (10)$$

with $S^{ech}$ the spectrum transmitted through the sample, $\theta = L_1, L_2, \ldots L_M$, and $\hat{\theta} = \hat{L}_1^{ech}, \hat{L}_2^{ech}, \ldots, \hat{L}_M^{ech}$ the estimated characteristic thicknesses.

Since the calibration basis only comprises a finite discrete number of material thicknesses, the likelihoods for the intermediate thicknesses are advantageously calculated by interpolation, either by interpolating the calibration spectra, or by interpolating the likelihood.

Interpolation enables the number of necessary calibration spectra to be limited. Linear or polynomial interpolation models can be used, or any other interpolation model describing at best the behaviour of the spectra or of the likelihood as a function of the characteristic thicknesses of the calibration materials.

It can be an interpolation of calibration spectra. Thus, a larger number of spectra named reference spectra is available, and these are used to calculate the value of a likelihood function corresponding to the likelihood of this reference spectrum taking into account the spectrum transmitted through the sample $S^{ech}$.

The reference spectra refer both to the calibration spectra and to the interpolated spectra (values of an interpolation function of said calibration spectra).

In particular, an interpolation of the calibration spectra can be performed by an interpolation function depending on the thickness of one of the calibration materials. The calibration basis can thus be enhanced by calibration spectra named interpolated spectra.

Subsequently, the values of a likelihood function are calculated from the spectrum of the sample $S^{ech}$ and from the spectra of the enhanced calibration basis. The maximum of the values of the likelihood function is then searched for, this maximum being associated with the estimations of the characteristic thicknesses.

Preferably, an interpolation of the calibration spectra is performed by an interpolation function depending on at least one variable, each variable corresponding to the thickness of one of the calibration materials. More preferentially, the interpolation function depends on several variables, corresponding to the thicknesses of each of the calibration materials.

A linear interpolation can for example be performed on the logarithm of the energy spectra. Let a calibration basis with two calibration materials. Let a thickness $l_1$ of the material MAT1 comprised between $L_1^k$ and $L_1^{k+1}$, and a thickness $l_2$ of the material MAT2 comprised between $L_2^q$ and $L_2^{q+1}$. The spectrum transmitted through a thickness $l_1$ of the material MAT1 joined to a thickness $l_2$ of the material MAT2 can be estimated by interpolating the spectra of the calibration basis. For example the spectra in $l_1, L_1^q$ (respectively in $l_1, L_2^{q+1}$) can be calculated from the spectra in $L_1^k$, $L_2^q$ and $L_1^{k+1}$, $L_2^q$ (respectively in $L_1^k$, $L_2^{q+1}$ and $L_1^{k+1}$, $L_2^{q+1}$). For each channel j, the number of photons is given by:

$$\ln(S_j^{base}(l_1, L_2^{var})) = \quad (11)$$

$$\ln(S_j^{base}(L_1^k, L_2^{var})) + \ln(S_j^{base}(L_1^{k+1}, L_2^{var})) * \frac{L_1^k - l_1}{L_1^k - L_1^{k+1}}$$

with $L_2^{var} = L_2^q$ or $L_2^{var} = L_2^{q+1}$

The spectrum in $l_1, l_2$ can then be interpolated from the previously calculated spectra in $l_1, L_2^q$ and $l_1, L_2^{q+1}$. The value of the spectrum in the channel j for a thickness $l_1$ of the material MAT1 joined to a thickness $l_2$ of the material MAT2 is obtained as follows:

$$\ln(S_j^{base}(l_1, l_2)) = \ln(S_j^{base}(l_1, L_2^q)) + \ln(S_j^{base}(l_1, L_2^{q+1})) * \frac{l_1 - l_2}{l_1 - L_1^{l+1}} \quad (12)$$

Alternatively, a non-linear interpolation is performed, for example by a Lagrange polynomial or a cubic Hermite polynomial.

The interpolation by an interpolation function depending on the thickness of a calibration material enables a calibration spectrum to be obtained for each thickness of this calibration material located within a determined interval. Interpolation of spectra can also simply consist in increasing the number of available spectra, by adding to the initial calibration spectra a finite number of spectra obtained by interpolation.

Alternatively or additionally, an interpolation of the values of the likelihood function is performed. Thus, a larger number of values is available, among which a maximum is searched for.

In particular an interpolation of the values of the likelihood function can be performed by an interpolation function depending on at least one variable, each variable corresponding to the thickness of one of the calibration materials. More preferentially the interpolation function depends on several variables, corresponding to the thicknesses of each of the calibration materials.

Subsequently, the maximum of the values of the likelihood function is searched for, among the initial values and the values obtained by interpolation. This maximum is associated with the estimations of the characteristic thicknesses.

For example, an interpolation of the values of the likelihood function is performed using a function of two variables. Each variable corresponds to one of the materials MAT1 or MAT2. This function is advantageously non-linear, for example a second order polynomial function of the type:

$$F(L_1, L_2) = a + bL_1 + cL_2 + dL_1L_2 + eL_1^2 + fL_2^2 \quad (13)$$

where a, b, c, d, e, f are constants adjusted according to the least square method, to the values calculated in step 32.

Interpolation by an interpolation function depending on the thickness of a calibration material enables a value of the likelihood function to be obtained for each thickness of this calibration material located within a determined interval. Interpolation of the values of the likelihood function can also simply consist in increasing a number of available values of the likelihood function, by adding to the initial values a finite number of values obtained by interpolation.

Interpolations make it possible to resort to a reduced number of calibration spectra, while providing a high accuracy of estimation of the characteristic thicknesses.

Both interpolation types can be combined and/or implemented several times to gradually refine the estimation of the characteristic thicknesses (iterative methods).

For example, an interpolation of the calibration spectra is performed to obtain a plurality of values of the likelihood function, then these values are interpolated and a maximum of the obtained values is searched for after this second interpolation.

Several successive interpolations can also be implemented, reducing each time the interval of considered thicknesses and the pitch, as a function of the previously obtained estimation. In particular, successive cycles of searching a maximum of the values of the likelihood function and of estimating the characteristic thicknesses are implemented. At each cycle, a pitch of the thicknesses of calibration material is decreased, said thicknesses being associated with the calibration spectra and/or with the values of the likelihood function. Preferably, the decrease in this pitch comes along a decrease in a considered interval of thicknesses. The calibration spectra here refer to the initial calibration spectra and when necessary spectra obtained by interpolation(s). The values of the likelihood function here refer to the values calculated from the calibration spectra and when necessary to values directly obtained by interpolation(s).

The detector 403 is connected to a processor 404, configured to implement the characterizing method according to the invention. The processor 404 is connected to a memory 405 storing the calibration spectra. The processor receives in input a spectrum transmitted through the sample, and outputs the estimations of the characteristic thicknesses of the sample.

Figure 6:
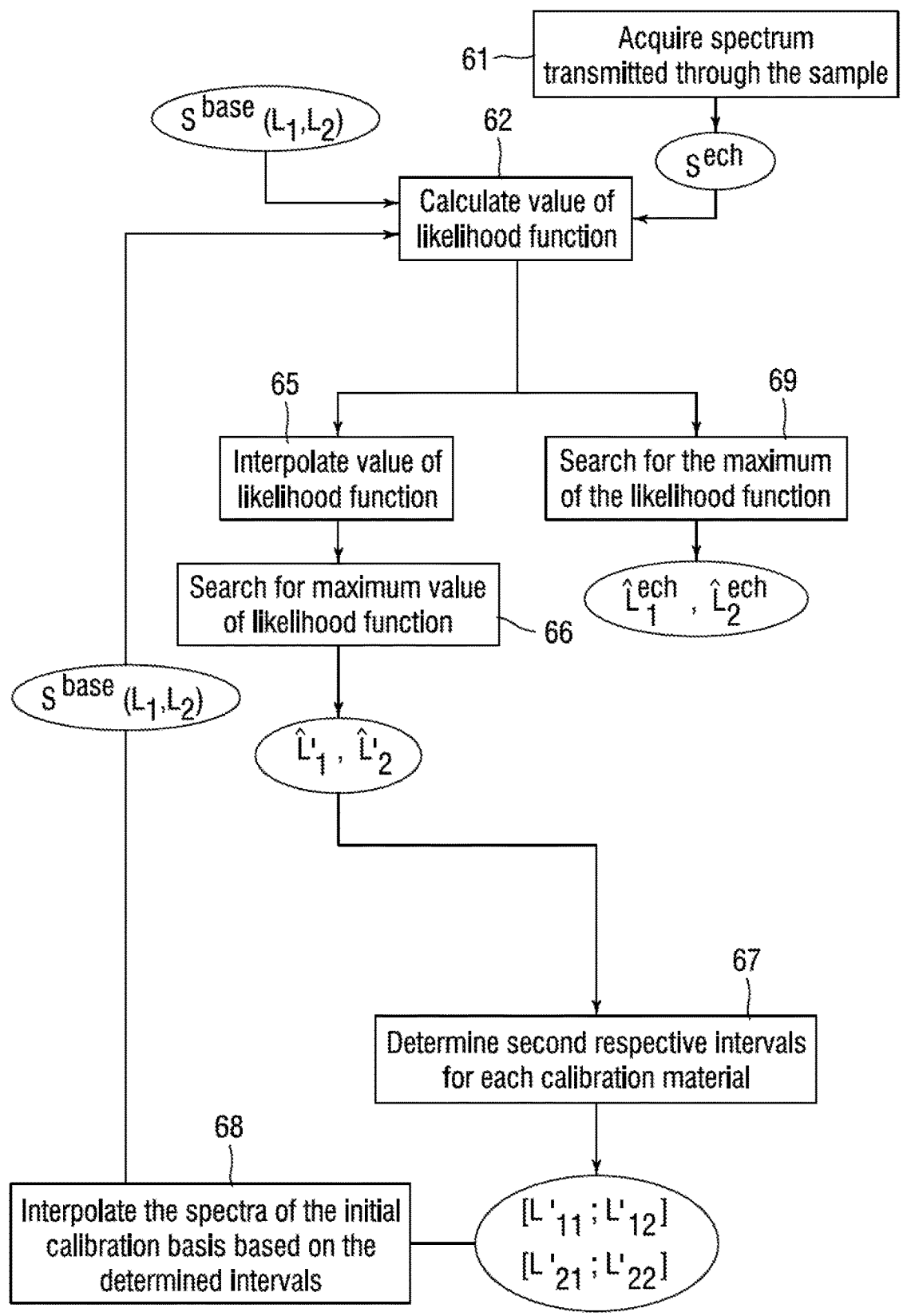
FIG. 6 schematically illustrates a second embodiment of the method according to the invention.

FIG. 6 illustrates an advantageous exemplary method implementing two successive cycles for searching a maximum of the values of the likelihood function and estimating the characteristic thicknesses.

In a first step 61, the spectrum transmitted through the sample $S^{ech}$ is acquired. Subsequently (step 62) the values of a likelihood function are calculated from this spectrum $S^{ech}$ and from each of the calibration spectra $S^{base}(L_1; L_2)$ of an initial calibration basis. The initial calibration basis corresponds to stacks of gauge blocks of a thickness $L_1$ of the material MAT1 and a thickness $L_2$ of the material MAT2, with:

$L_1$ extending over a first interval associated with the material MAT1 (interval [0; $L_{MAT1max}$] for example) and according to a first sampling pitch associated with the material MAT1

$$\left(\text{pitch}\frac{L_{MAT1\ max}}{N1}\right),$$

and $L_2$ extending over a first interval associated with the material MAT2 (interval [0; $L_{MAT2max}$] for example) and according to a first sampling pitch associated with the material MAT2

$$\left(\text{pitch}\frac{L_{MAT2\ max}}{N2}\right).$$

Thus N1*N2 spectra acquired with the combinations of thicknesses ranging from 0 to $L_{MAT1\ max}$ for the material MAT1 and from 0 to $L_{MAT2\ max}$ for the material MAT2 are obtained.

In step 65, an interpolation of the values of the likelihood function is performed. Subsequently, the maximum of the values of the likelihood function which are available after interpolation is searched for (step 66). This maximum is associated with thicknesses $\hat{L}'_1$ and $\hat{L}'_2$ respectively of the material MAT1 and the material MAT2, and form approximate values of the estimations of the characteristic thicknesses.

In step 67, for each calibration material, a second respective interval is determined, narrower than the first interval associated with the same calibration material, and centred on the corresponding approximate value. The second intervals [$L'_{11}$; $L'_{12}$] and [$L'_{21}$; $L'_{22}$] are obtained.

Subsequently, an interpolation of the spectra of the initial calibration basis is performed on these second intervals

[L'$_{11}$; L'$_{12}$] and [L'$_{21}$; L'$_{22}$] (step 68). An enhanced calibration basis is obtained, comprising the spectra S'$^{base}$(L$_1$; L$_2$).

The enhanced calibration basis corresponds to:

a thickness L$_1$ of the material MAT1 extending over the second interval [L'$_{11}$; L'$_{12}$] (narrower than the interval [0; L$_{MAT1 max}$]) and according to a second respective sampling pitch lower than the first sampling pitch associated with the same calibration material (pitch lower than $$\frac{L_{MAT1\ max}}{N1}),$$

and a thickness L$_2$ of the material MAT2 extending over the second interval [L'$_{21}$; L'$_{22}$] (narrower than the interval [0; L$_{MAT2\ max}$]) and according to a second respective sampling pitch lower than the first sampling pitch associated with the same calibration material (pitch lower than $$\frac{L_{MAT2\ max}}{N2}).$$

Step 62 of calculating the values of a likelihood function is subsequently reiterated, this time from the spectrum S$^{ech}$ and from each of the spectra of the enhanced calibration basis S'$^{base}$(L$_1$; L$_2$).

Finally, the maximum of the thus calculated values is searched for (step 69). This maximum is associated with thicknesses $\hat{L}'_1{}^{ech}$ and $\hat{L}'_2{}^{ech}$ of the material MAT1 and the material MAT2, respectively, and form consolidated estimations of the characteristic thicknesses.

Figure 7:
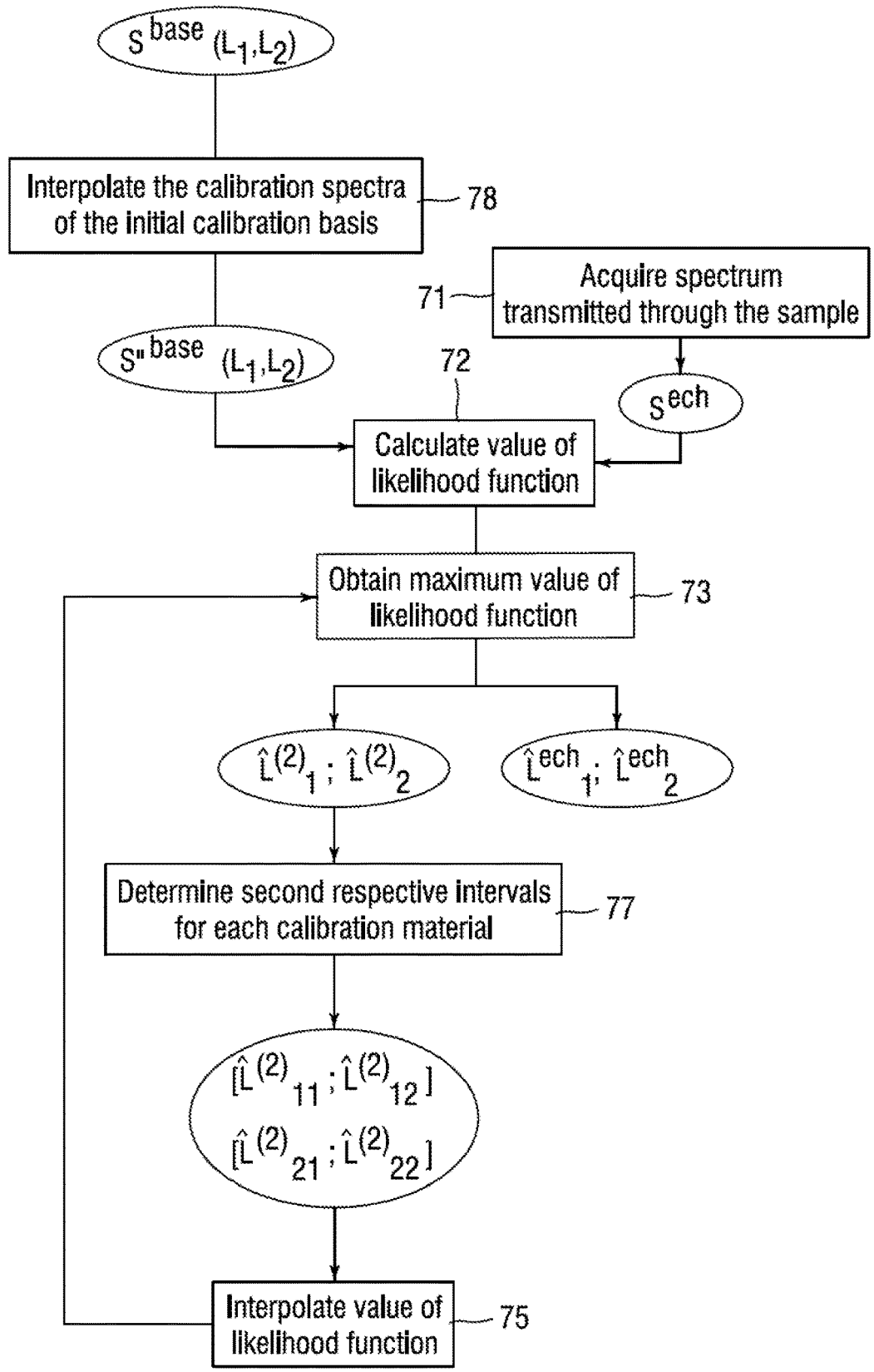
FIG. 7 illustrates an alternative for the embodiment of FIG. 6.

According to an alternative depicted in FIG. 7, a first performed interpolation is an interpolation of the calibration spectra of the above-defined initial calibration basis S$^{base}$(L$_1$; L$_2$) (step 78). An enhanced calibration basis s''$^{base}$(L$_1$; L$_2$) is obtained, corresponding to the N1*N2 initial spectra, plus values obtained by interpolation. The enhanced calibration basis is associated, for each calibration material, to a first respective interval of thicknesses.

Subsequently, the spectrum transmitted through the sample, S$^{ech}$, is acquired (step 71), and the values of a likelihood function are calculated from this spectrum S$^{ech}$ and from each of the spectra of the enhanced calibration basis (step 72).

The maximum of the values of the likelihood function thus obtained is searched for (step 73). The thicknesses associated with this maximum form approximate values $\hat{L}_1{}^{(2)}$ and $\hat{L}_2{}^{(2)}$ of the estimations of the characteristic thicknesses.

Subsequently, in step 77, second intervals [L$_{11}{}^{(2)}$, L$_{12}{}^{(2)}$] and [L$_{21}{}^{(2)}$; L$_{22}{}^{(2)}$] are determined, each being associated with one of the calibration materials. Each second interval is centred on the previously obtained approximate value associated with the same calibration material. Each second interval is narrower than the first interval of thicknesses such as defined above, associated with the same calibration material and with the enhanced calibration basis.

Then, an interpolation of the values of the likelihood function is performed (step 75). Subsequently, the maximum of the values of the likelihood function is performed (new iteration of step 73), this time among the values of the likelihood function available after this second interpolation. This maximum is associated with thicknesses $\hat{L}_1{}^{ech}$ and $\hat{L}_2{}^{ech}$ respectively of the material MAT1 and the material MAT2, and form consolidated estimations of the characteristic thicknesses.

As specified above, the calibration spectra can be experimentally obtained, using stacks of gauge blocks, each gauge block being made of a calibration material and having a known respective thickness, or numerically simulated. Thus, a first calibration basis is obtained.

Each calibration material has an effective atomic number. The maximum and the minimum of the effective atomic numbers of the considered calibration materials define together an interval of effective atomic number. If the mean effective atomic number of the sample is outside this interval, at least one of the associated characteristic thicknesses can be negative. For example, if the material MAT1 is polyethylene ($Z_{eff}$=5.53), the material MAT2 is PVC ($Z_{eff}$=4.23), a sample of iron ($Z_{eff}$=26), of chromium ($Z_{eff}$=24), or of chlorine ($Z_{eff}$=17), will be characterised by a negative characteristic thickness of polyethylene. We are therefore in an area not covered by the first calibration basis.

A common solution consists in performing an extrapolation of the points of the first calibration basis.

A more reliable solution is here provided. The aim is to enhance the first calibration basis using measurements or simulations implying an additional standard (or additional gauge block) of a determined thickness made of a reference material, distinct from the calibration materials MAT1 and MAT2. Said reference material has an effective atomic number outside the above-described interval. The characteristic thicknesses of this additional standard, in the calibration material basis, are known, and at least one of these characteristic thicknesses is negative. In other words, the spectrum of the energy transmitted through the additional standard is equal to the spectrum of the energy transmitted through a virtual stack of gauge blocks of a calibration material, one gauge block at least having a negative thickness (hence the term "virtual").

The first calibration basis is thus enhanced by points associated with negative characteristic thicknesses. The characteristic thicknesses associated with said additional standard can be determined using a method according to prior art such as described in the introduction.

Thus, each calibration spectrum corresponds to the spectrum of the energy transmitted through a stack of gauge blocks each formed of a known thickness of a calibration material, and when necessary a gauge block having a negative thickness (virtual gauge block).

Figure 8:
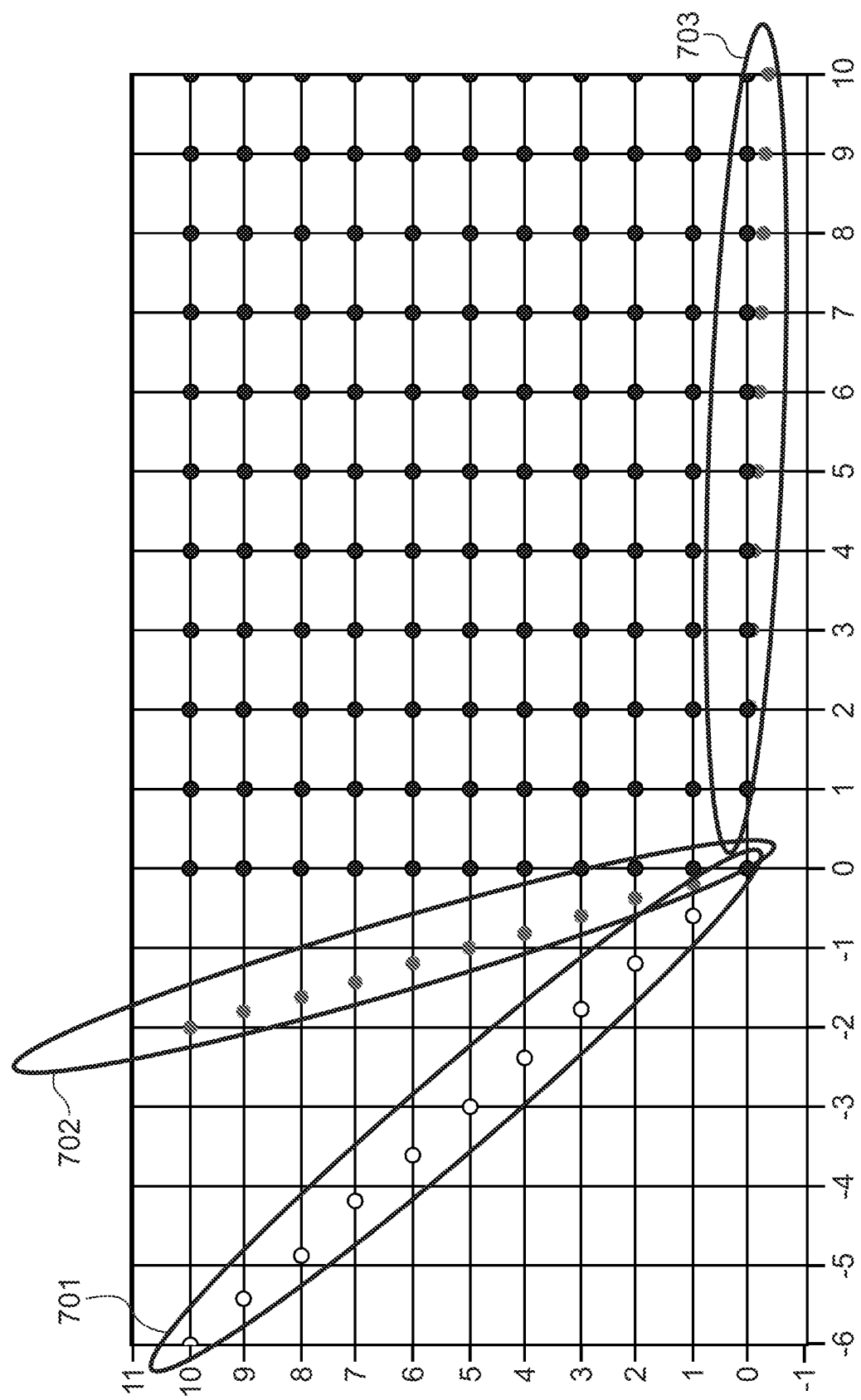
FIG. 8 illustrates a calibration basis enhanced according to the invention.

In FIG. 8, the points of a thus enhanced calibration basis are schematically represented. A first series of points corresponds to combinations of polyethylene and PVC, the thicknesses of polyethylene and of PVC taking integer values between 0 and 10 included (length unit). This calibration basis is enhanced by measurements of energy spectra of gauge blocks of different thicknesses of calcium ($Z_{eff}$=20, points 701), of sulphur ($Z_{eff}$=16, points 702), of beryllium ($Z_{eff}$=4, points 703).

The invention is not limited to a decomposition in a basis of two calibration materials. A decomposition in a basis of more than two calibration materials, for example three, four or more can be performed. Furthermore, the considered calibration materials do not have to meet any particular condition. The use of bases with more than 2 materials can prove to be useful when there is a continuity of the energy spectrum (known as "k-edge") in the measured energy range.

The method according to the invention can comprise, after estimation of the characteristic thicknesses, an additional step of processing, comprising for example the estimation of a concentration in the sample, or an estimation of the effective atomic number of the sample.

In particular, a function $f$ can be determined, such as:

$$Z_{\mathit{eff}}=f(\rho_1 \hat{L}_1^{ech}, \rho_2 \hat{L}_2^{ech}, \ldots, \rho_M \hat{L}_M^{ech}) \qquad (14)$$

with M being the calibration materials, $\rho_i$ the density of the calibration material i, $\hat{L}_i^{ech}$ the estimation of the characteristic length associated with the calibration material i.

There is for example:

$$f(x) = a + bx + cx^2 + dx^3, \text{ with } x = \frac{\rho_1 \hat{L}_1^{ech}}{\rho_1 \hat{L}_1^{ech} + \rho_2 \hat{L}_2^{ech}} \qquad (15)$$

with a, b, c, d real numbers and for example polyethylene for MAT1 and PVC for MAT2.

If the basis contains more than two materials, the following function can be used:

$$f(\rho_i, \hat{L}_i^{ech}) = \left( \frac{\sum_{i=1}^{M} \rho_i \hat{L}_i^{ech} Z_{\mathit{eff}}^p}{\sum_{i=1}^{M} \rho_i \hat{L}_i^{ech}} \right)^{1/p} \qquad (16)$$

p being estimated from measurements performed on materials of known $Z_{\mathit{eff}}$.

The invention is especially applied in the medical field, especially for analysing biological samples by spectral tomography.

The invention is not limited to the examples which have just been developed, and numerous alternatives can be imagined without departing from the scope of the present invention, for example other calibration materials, other types of interpolations, etc. For example, other definitions of the likelihood function can be considered, based on other statistical modelling of the transmission rate through the sample in the spectrometer.

The invention claimed is:

1. A method for characterization of a sample, the method comprising:
    acquiring, by circuitry comprising a memory and a detector connected to a processor, a spectrum transmitted through the sample, said spectrum being an energy spectrum defined by a number of photons transmitted through the sample in each channel of a plurality of energy channels located in an X spectral band and/or a gamma spectral band;
    acquiring, by said memory, calibration spectra, wherein each of the calibration spectra corresponds to a calibration spectrum transmitted through a stack of gauge blocks, each gauge block of said stack consisting of a different calibration material, and said stack consisting of a different set of thicknesses for each of the gauge blocks;
    calculating, by said circuitry, values of a likelihood function from said acquired calibration spectra and from the spectrum transmitted through the sample;
    determining, by said circuitry, a maximum likelihood value from among the calculated values of the likelihood function, the determined maximum likelihood value corresponding to an acquired calibration spectrum corresponding to a stack of gauge blocks, each gauge block of the stack consisting of a different calibration material, the acquired calibration spectrum being most similar to the acquired spectrum transmitted through the sample; and
    outputting, from the circuitry, a plurality of estimated characteristic thicknesses, each of the outputted estimated characteristic thicknesses being associated with a different calibration material, wherein each different calibration material making up a gauge block from the stack of gauge blocks of the acquired calibration spectrum corresponding to said determined maximum likelihood value, the method further comprising:
    interpolating the calculated values of the likelihood function by a likelihood interpolation function, said interpolated calculated values being associated with combinations of predetermined thicknesses of respective calibration materials, such that for each respective calibration material a corresponding set of thicknesses is located within a first interval associated with the respective calibration material;
    searching for a maximum among calculated values of said likelihood interpolation function, thicknesses associated with said maximum among the calculated values of the likelihood interpolation function forming approximate values of the plurality of estimated characteristic thicknesses of the respective calibration materials;
    interpolating the calibration spectrum by a spectrum interpolation function depending on at least one variable, said at least one variable corresponding to a thickness of said each calibration material, and taking values located within a second respective interval, narrower than the first interval associated with the respective calibration material and centred on an approximate value of said approximate values; and
    for each value of said spectrum interpolation function, calculating a value of the likelihood function and searching for a maximum among said calculated values of the likelihood function, thicknesses associated with the maximum among the calculated values of the likelihood function for each value of the spectrum interpolation function forming the plurality of estimated characteristic thicknesses of the respective calibration materials.

2. The method according to claim 1, wherein said outputting the plurality of estimated characteristic thicknesses comprises searching for the maximum likelihood value from among the calculated values of the likelihood function, the thicknesses associated with the maximum likelihood value from among the calculated values of the likelihood function forming the plurality of estimated characteristic thicknesses.

3. The method according to claim 1, wherein at least one of the interpolating the calculated values of the likelihood function and the interpolating the calibration spectrum implements a non-linear interpolation function.

4. The method according to claim 1, wherein the likelihood function is determined from a statistical modelling of the spectrum transmitted through the sample, according to a Poisson distribution.

5. The method according to claim 1, wherein the likelihood function calculated from said calibration spectrum and from the spectrum transmitted through the sample, is defined by:

$$\ln(V(S^{ech}, S^{base}(L_1, \ldots, L_M))) =$$

$$C\left(-\sum_{j=1}^{R} S_j^{base}(L_1, \ldots, L_M) + \sum_{j=1}^{R} S_j^{ech} \ln(S_j^{base}(L_1, \ldots, L_m))\right)$$

where V is the likelihood function,
ln is the naperian logarithm,
$S^{ech} = \sum_{j=1}^{R} S_j^{ech}$ is the spectrum transmitted through the sample ($S^{ech}$), presenting j=R energy channels,
$S^{base}(L_1, \ldots, L_M) = \sum_{j=1}^{R} S_j^{base}(L_1, \ldots, L_M)$ is the calibration spectrum with j=R energy channels of the combination of M calibration materials each associated with a respective thickness $L_1, \ldots, L_M$, and C is a constant.

6. The method according to claim 1, wherein at least one calibration spectrum corresponding to the spectrum transmitted through an additional standard is used, the additional standard consisting of a determined thickness of a reference material, wherein the reference material is different from each of the calibration materials, and wherein the additional standard is associated with a virtual combination of predetermined thicknesses of calibration materials such that at least one thickness in the virtual combination takes a negative value.

7. The method according to claim 1, wherein a step of manufacturing a calibration basis comprising said calibration spectrum is carried out, comprising:
measuring spectra transmitted through each of a plurality of the stacks of gauge blocks, each gauge block consisting of a predetermined thickness of a different calibration material;
for at least one additional standard, measuring a spectrum transmitted through the at least one additional standard, the at least one additional standard consisting of a determined thickness of a reference material, wherein the reference material is different from each of the calibration materials, and wherein the at least one additional standard is associated with a virtual combination of predetermined thicknesses of calibration materials such that at least one thickness in the virtual combination takes a negative value; and
ranking of the spectra transmitted through said each of the plurality of the stacks of gauge blocks and of the spectrum transmitted through the at least one additional standard into a single database connecting a spectrum to a combination of thicknesses of the calibration materials.

8. The method according to claim 1, comprising calculating a mean effective atomic number of the sample as a function of the plurality of estimated characteristic thicknesses.

9. The method according to claim 8, wherein the mean effective atomic number is lower than 30.

10. A non-transitory computer-readable storage medium, storing computer-readable instructions thereon, which, when executed by a processor, cause the processor to perform the method according to claim 1.

11. A device for characterizing a sample, comprising:
an electromagnetic source emitting into an X spectral band and/or a gamma spectral band;
the detector configured to measure a spectrum transmitted through the sample, said spectrum being defined by a number of photons transmitted through the sample in each channel of a plurality of energy channels;
the processor configured to implement the method according to claim 1; and
a memory receiving the calibration spectrum and being connected to the processor.

12. The method according to claim 1, further comprising calculating a mean effective atomic number of the sample and determination of a function $f$ such that:

$$Z_{eff} = f(\rho_1 \hat{L}_1^{ech}, \rho_2 \hat{L}_2^{ech}, \ldots, \rho_M \hat{L}_M^{ech})$$

with M being a number of calibration materials,
$\rho_i$ being density of a calibration material i, and
$\hat{L}_i^{ech}$ being an estimated characteristic thickness associated with the calibration material i.

13. The method according to claim 12, wherein the function $f$ is defined by:

$$f(x) = a + bx + cx^2 + dx^3, \text{ with } x = \frac{\rho_1 \hat{L}_1^{ech}}{\rho_1 \hat{L}_1^{ech} + \rho_2 \hat{L}_2^{ech}}$$

with a, b, c, d being real numbers.

14. The method according to claim 12, wherein the function $f$ is defined by:

$$f(\rho_i, \hat{L}_i^{ech}) = \left( \frac{\sum_{i=1}^{M} \rho_i \hat{L}_i^{ech} Z_{eff,i}^p}{\sum_{i=1}^{M} \rho_i \hat{L}_i^{ech}} \right)^{1/p}$$

p being estimated from measurements performed on the calibration materials, $Z_{eff,i}^p$ being a mean effective atomic number of one of the calibration materials, and M>2.

15. A method for characterization of a sample, the method comprising:
acquiring, by circuitry comprising a memory and a detector connected to a processor, a spectrum transmitted through the sample, said spectrum being an energy spectrum defined by a number of photons transmitted through the sample in each channel of a plurality of energy channels located in an X spectral band and/or a gamma spectral band;
acquiring, by said memory, calibration spectra, wherein each of the calibration spectra corresponds to a calibration spectrum transmitted through a stack of gauge blocks, each gauge block of said stack consisting of a different calibration material, and said stack consisting of a different set of thicknesses for each of the gauge blocks;
calculating, by said circuitry, values of a likelihood function from said acquired calibration spectra and from the spectrum transmitted through the sample;
determining, by said circuitry, a maximum likelihood value from among the calculated values of the likelihood function, the determined maximum likelihood value corresponding to an acquired calibration spectrum corresponding to a stack of gauge blocks, each gauge block of the stack consisting of a different calibration material, the acquired calibration spectrum being most similar to the acquired spectrum transmitted through the sample; and
outputting, from the circuitry, a plurality of estimated characteristic thicknesses, each of the outputted estimated characteristic thicknesses being associated with a different calibration material, wherein each different calibration material making up a gauge block from the stack of gauge blocks of the acquired calibration spectrum corresponding to said determined maximum likelihood value, the method further comprises
interpolating the calibration spectrum by a spectrum interpolation function, said calibration spectrum being associated with combinations of predetermined thicknesses of respective calibration materials, such that for each respective calibration material a corresponding set of thicknesses is located within a first interval associated with the respective calibration material;

for each value of said spectrum interpolation function, calculating a value of the likelihood function and searching for a maximum among said calculated values of the likelihood function, thicknesses associated with the maximum among the calculated values of the likelihood function for each value of the spectrum interpolation function forming approximate values of the plurality of estimated characteristic thicknesses of the calibration materials;

interpolating the calculated values of the likelihood function by a likelihood interpolation function depending on at least one variable, each of said at least one variable corresponding to a thickness of said each calibration material, and taking values located within a second respective interval, narrower than the first interval associated with the respective calibration material and centred on one of said approximate values of the plurality of estimated characteristic thicknesses of the respective calibration material; and searching for a maximum among calculated values of said likelihood interpolation function, thicknesses associated with said maximum among the calculated values of the likelihood interpolation function forming the estimated characteristic thicknesses of the calibration materials.

16. The method according to claim 15, wherein at least one of the interpolating the calculated values of the likelihood function and the interpolating the calibration spectrum implements a non-linear interpolation function.

17. The method according to claim 15, wherein the likelihood function is determined from a statistical modelling of the spectrum transmitted through the sample, according to a Poisson distribution.

18. The method according to claim 15, wherein the likelihood function calculated from said calibration spectrum and from the spectrum transmitted through the sample, is defined by:

$$\ln(V(S^{ech}, S^{base}(L_1, \ldots, L_M))) = C\left(-\sum_{j=1}^{R} S_j^{base}(L_1, \ldots, L_M) + \sum_{j=1}^{R} S_j^{ech} \ln(S_j^{base}(L_1, \ldots, L_M))\right)$$

where V is the likelihood function,
ln is the naperian logarithm,
$S^{ech}(L_1, \ldots, L_M) = \sum_{j=1}^{R} S_j^{ech}$ is the spectrum transmitted through the sample ($S^{ech}$), presenting j=R energy channels,
$S^{base}(L_1, \ldots, L_M)$, and
C is a constant.

19. The method according to claim 15, wherein at least one calibration spectrum corresponding to the spectrum transmitted through an additional standard is used, the additional standard consisting of a determined thickness of a reference material, wherein the reference material is different from each of the calibration materials, and wherein the additional standard is associated with a virtual combination of predetermined thicknesses of calibration materials such that at least one thickness in the virtual combination takes a negative value.

20. The method according to claim 15, wherein a step of manufacturing a calibration basis comprising said calibration spectrum is carried out, comprising:

measuring spectra transmitted through each of a plurality of the stacks of gauge blocks, each gauge block consisting of a predetermined thickness of a different calibration material;

for at least one additional standard, measuring a spectrum transmitted through the at least one additional standard, the at least one additional standard consisting of a determined thickness of a reference material, wherein the reference material is different from each of the calibration materials, and wherein the at least one additional standard is associated with a virtual combination of predetermined thicknesses of calibration materials such that at least one thickness in the virtual combination takes a negative value; and ranking of the spectra transmitted through said each of the plurality of the stacks of gauge blocks and of the spectrum transmitted through the at least one additional standard into a single database connecting a spectrum to a combination of thicknesses of the calibration materials.

21. The method according to claim 15, comprising calculating a mean effective atomic number of the sample as a function of the plurality of estimated characteristic thicknesses.

22. A non-transitory computer-readable storage medium, storing computer-readable instructions thereon, which, when executed by a processor, cause the processor to perform the method according to claim 15.

23. A device for characterizing a sample, comprising:
an electromagnetic source emitting into an X spectral band and/or a gamma spectral band;
the detector configured to measure a spectrum transmitted through the sample, said spectrum being defined by a number of photons transmitted through the sample in each channel of a plurality of energy channels;
the processor configured to implement the method according to claim 15; and
a memory receiving the calibration spectrum and being connected to the processor.

24. The method according to claim 15, further comprising calculating a mean effective atomic number of the sample and determination of a function $f$ such that:

$$Z_{eff} = f(\rho_1 \hat{L}_1^{ech}, \rho_2 \hat{L}_2^{ech}, \ldots, \rho_M \hat{L}_M^{ech})$$

with M being a number of calibration materials,
$\pi_i$ being density of a calibration material i, and
$\hat{L}_i^{ech}$ being an estimated characteristic thickness associated with the calibration material i.

* * * * *